US010250630B2

(12) United States Patent
Singuru

(10) Patent No.: US 10,250,630 B2
(45) Date of Patent: Apr. 2, 2019

(54) SYSTEM AND METHOD FOR PROVIDING COMPUTER NETWORK SECURITY

(71) Applicant: Wipro Limited, Bangalore (IN)

(72) Inventor: Radha Krishna Singuru, Hyderabad (IN)

(73) Assignee: WIPRO LIMITED, Bangalore (IN)

( * ) Notice: Subject to any disclaimer, the term of this patent is extended or adjusted under 35 U.S.C. 154(b) by 119 days.

(21) Appl. No.: 14/943,048

(22) Filed: Nov. 17, 2015

(65) Prior Publication Data

US 2017/0099313 A1    Apr. 6, 2017

(30) Foreign Application Priority Data

Oct. 5, 2015    (IN) .......................... 5315/CHE/2015

(51) Int. Cl.
| | |
|---|---|
| *H04L 29/06* | (2006.01) |
| *H04L 12/931* | (2013.01) |
| *G06F 9/455* | (2018.01) |
| *H04L 12/24* | (2006.01) |
| *G06F 17/30* | (2006.01) |
| *H04L 12/46* | (2006.01) |
| *H04L 12/715* | (2013.01) |
| *H04L 12/717* | (2013.01) |

(52) U.S. Cl.
CPC ...... *H04L 63/1433* (2013.01); *G06F 9/45558* (2013.01); *G06F 17/30917* (2013.01); *H04L 12/4625* (2013.01); *H04L 41/0893* (2013.01); *H04L 49/70* (2013.01); *H04L 63/1441* (2013.01); *H04L 63/20* (2013.01); *G06F 2009/45587* (2013.01); *H04L 45/42* (2013.01); *H04L 45/64* (2013.01)

(58) Field of Classification Search
CPC . H04L 63/14; H04L 63/1408; H04L 63/1433; H04L 63/1441; G06F 17/30917
See application file for complete search history.

(56) References Cited

U.S. PATENT DOCUMENTS 8,726,379 B1 * 5/2014 Stiansen ............. H04L 63/1491
                                                    726/22
8,898,784 B1   11/2014 Alexander et al.
(Continued)

FOREIGN PATENT DOCUMENTS

EP          2 955 894       12/2015
WO      WO 2015/041706       3/2015

OTHER PUBLICATIONS

European Search Report dated Feb. 16, 2017 in counterpart European Patent Application No. 16159529.3, 7 pages.

*Primary Examiner* — Khang Do
(74) *Attorney, Agent, or Firm* — Finnegan, Henderson, Farabow, Garrett & Dunner LLP

(57) ABSTRACT

This disclosure relates generally to computer network, and more particularly to a system and method for providing computer network security. In one embodiment, a method is provided for providing computer network security. The method comprises gathering threat information from one or more sources, deriving security intelligence based on the threat information, determining a security measure based on the security intelligence, and dynamically applying the security measure to a computer network using a set of virtual appliances and a set of virtual switches.

14 Claims, 3 Drawing Sheets

(56) References Cited

U.S. PATENT DOCUMENTS

| | | | |
|---|---|---|---|
| 9,038,151 B1 * | 5/2015 | Chua | H04L 45/02 709/223 |
| 9,210,185 B1 * | 12/2015 | Pinney Wood | G06F 17/30958 |
| 2007/0209075 A1 * | 9/2007 | Coffman | H04L 63/14 726/23 |
| 2008/0028470 A1 | 1/2008 | Remington et al. | |
| 2011/0247071 A1 * | 10/2011 | Hooks | G06F 21/567 726/24 |
| 2012/0233656 A1 * | 9/2012 | Rieschick | H04L 63/1441 726/1 |
| 2013/0074143 A1 * | 3/2013 | Bu | H04L 63/1416 726/1 |
| 2013/0347116 A1 | 12/2013 | Flores et al. | |
| 2014/0359697 A1 * | 12/2014 | Ji | H04L 63/1433 726/1 |
| 2015/0089566 A1 | 3/2015 | Chesla | |
| 2015/0365438 A1 * | 12/2015 | Carver | H04L 63/1441 726/1 |

* cited by examiner

SYSTEM AND METHOD FOR PROVIDING COMPUTER NETWORK SECURITY

TECHNICAL FIELD

This disclosure relates generally to computer network, and more particularly to a system and method for providing computer network security.

BACKGROUND

Digital devices, including, for example, computers, notebook computers, laptops, tablet devices, cellular telephones, smart phones, have become ubiquitous in recent years. In an increasingly digital world, these digital devices are communicatively connected to a computer network to exchange information. Computer network security is an important aspect of the computer network and means activities designed to protect the computer network and the digital devices connected to the computer network from digital attacks and data theft. These activities protect the usability, reliability, integrity, and safety of the network and data. A network security breach has a serious impact on individual users as well as businesses.

Several techniques exist to provide computer network security. For example, currently network security is handled using expensive hardware appliances like firewalls, intrusion prevention systems, and virtual private networks (VPNs). However, these hardware appliances are typically pre-provisioned and therefore cannot be changed dynamically on the fly as required. In some instances, the software are upgraded at periodic intervals with new threat signatures whenever new threats are detected. Moreover, these hardware appliances are over-provisioned to handle the variable network traffic and load. Current techniques are therefore inefficient and limited in their ability to convert the threat information to the right security intelligence and to use the security intelligence accurately and timely. This may result in disruption of services and grave financial losses to an organization.

SUMMARY

In one embodiment, a method for providing computer network security is disclosed. In one example, the method comprises gathering threat information from one or more sources. The method further comprises deriving security intelligence based on the threat information. The method further comprises determining a security measure based on the security intelligence. The method further comprises dynamically applying the security measure to a computer network using a set of virtual appliances and a set of virtual switches.

In one embodiment, a system for providing computer network security is disclosed. In one example, the system comprises at least one processor and a memory communicatively coupled to the at least one processor. The memory stores processor-executable instructions, which, on execution, cause the processor to gather threat information from one or more sources. The processor-executable instructions, on execution, further cause the processor to derive security intelligence based on the threat information. The processor-executable instructions, on execution, further cause the processor to determine a security measure based on the security intelligence. The processor-executable instructions, on execution, further cause the processor to dynamically apply the security measure to a computer network using a set of virtual appliances and a set of virtual switches.

In one embodiment, a non-transitory computer-readable medium storing computer-executable instructions for providing computer network security is disclosed. In one example, the stored instructions, when executed by a processor, cause the processor to perform operations comprising gathering threat information from one or more sources. The operations further comprise deriving security intelligence based on the threat information. The operations further comprise determining a security measure based on the security intelligence. The operations further comprise dynamically applying the security measure to a computer network using a set of virtual appliances and a set of virtual switches.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
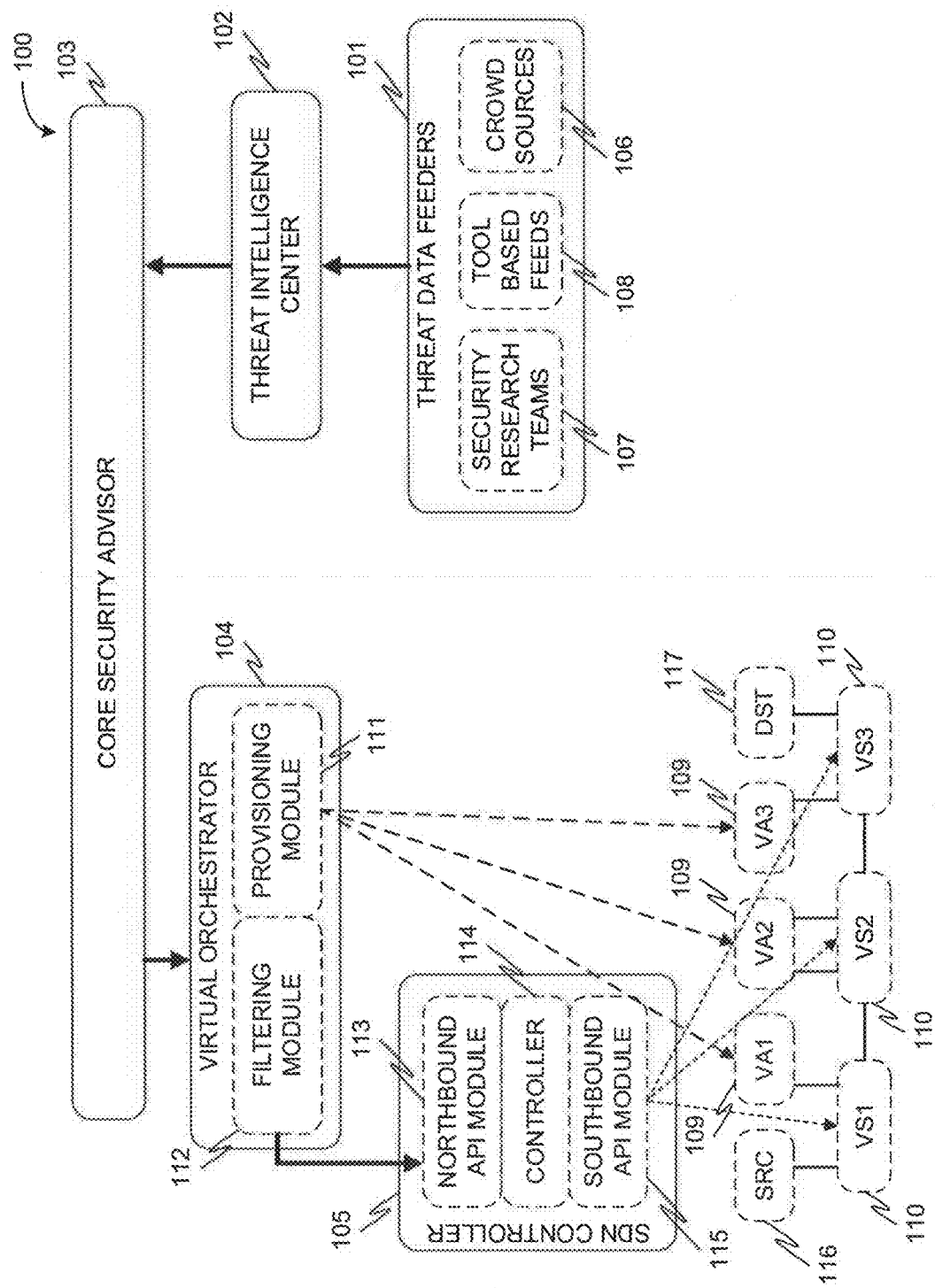
FIG. 1 is a block diagram of an exemplary system for providing computer network security in accordance with some embodiments of the present disclosure.

Referring now to FIG. 1, an exemplary system 100 for providing computer network security is illustrated in accordance with some embodiments of the present disclosure. In particular, the system 100 implements techniques for improved detection and prevention of network security threats in a computer network by retrieving threat information from various resources, determining security threats and corresponding security measures based on the threat information using intelligent filters and analytics, and applying these security measures to the computer network using virtual appliances and virtual switches. The system 100 comprises threat data feeders 101, a threat intelligence center 102, a core security advisor 103, a virtual orchestrator 104, and a SON controller 105.

The threat data feeders 101 gather threat related information from various sources. The various sources may include crowd source based public forums 106, internal or external security research teams 107, tool based feeds 108, and so forth. In some embodiments, tool based feeds 108 may include, but are not limited to, SPLUNK analysis based feeds that gather information from logs created by installed programs and applications. Further, in some embodiments, tool based feeds 108 may include network traffic analysis from a network traffic analyzer.

The threat intelligence center 102 collects data from various threat data feeders 101 and derives security intelligence by applying intelligent filters and analytics on the threat information. The security intelligence comprises potential security threats and corresponding security measures and is passed on to the core security advisor 103 for adaptive threat prevention and containment.

The core security advisor 103 is the central controller of the entire system 100. The core security advisor 103 receives the security intelligence from the threat intelligence center 102, and dynamically applies the security measures to the computer network using relevant virtual appliances 109 and virtual switches 110. In some embodiments, the core security advisor 103 maps the security intelligence to the relevant virtual appliances 109 that need to be deployed and to the relevant packet filters that is used to program the relevant virtual switches 110. The core security advisor 103 then passes the mapping to the virtual orchestrator 104. Further, in some embodiments, the core security advisor 103 may trigger an alert based on the security intelligence.

The virtual orchestrator 104 may be a proprietary orchestrator or one of the available orchestrator such as OpenStack™. The virtual orchestrator 104 includes two main modules namely a provisioning module 111 and a filtering module 112. The provisioning module 111 deploys (i.e., instantiates or deletes) various virtual appliances (e.g., VA1, VA2, and VA3) 109 dynamically on the fly and employs service chaining to connect them as required based on the mapping. Each of the virtual appliances 109 is a virtual machine for performing a pre-defined task and is implemented using network function virtualization. The virtual appliances 109 emulate a firewall, an intrusion prevention system (IPS), a deep packet inspection (DPI), a network traffic shaper, and so forth. Further, the filtering module 112 uses the SDN controller 105 to program various virtual switches (e.g., VS1, VS2, and VS3) 110 using various packet filters to steer network traffic appropriately based on the mapping. Each of the virtual switches 110 is programmed using software defined networking.

The SDN controller comprises a North bound API module 113, a controller 114, and a South bound API module 115. The North bound API module 113 uses the filters provided by the virtual orchestrator 104 and dynamically programs the virtual switches for steering network traffic from a source 116 to a destination 117. The dynamic programming is performed by the South bound API module 115 using various South bound protocols like Open Flow, NETCONF, XMPP, and so forth.

In operation, the system 100 gathers threat information from various sources such as external security agencies, crowd sourcing, internal research teal tool based feeds, and so forth. The system 100 then converts the gathered threat information to relevant security intelligence using intelligent filters and analytics. The security intelligence identifies possible security threats and corresponding security measures. In response to the threats identified and corresponding measures, the system 100 dynamically deploys virtual appliances (using network functions virtualization) and programs necessary virtual switches (using software defined networking). The programmed switches re-direct suspicious traffic to a different channel where appropriate virtual appliances are deployed to take preventive action. The system 100 may also be configured to trigger alerts of pre-configured type upon detecting any security threats, so as to notify the user or admin.

It should be noted that the system 100 may be implemented in programmable hardware devices such as programmable gate arrays, programmable array logic, programmable logic devices, and so forth. Alternatively, the system 100 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

Figure 2:
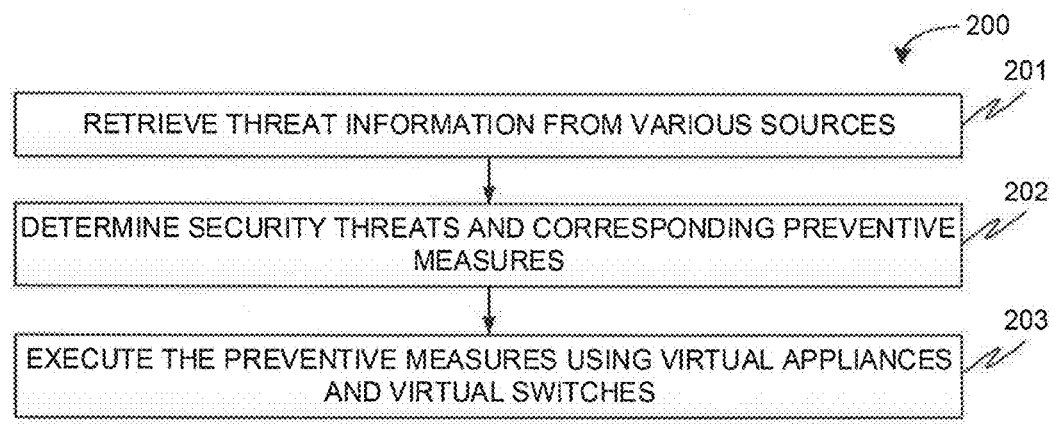
FIG. 2 is a flow diagram of an exemplary process overview for providing computer network security in accordance with some embodiments of the present disclosure.

Referring now to FIG. 2, an overview of an exemplary process 200 for providing computer network security is depicted via a flowchart in accordance with some embodiments of the present disclosure. The process 200 involves the steps of retrieving threat information from various sources at step 201, determining security threats and corresponding preventive measures at step 202, and executing the preventive measures using virtual appliances and virtual switches at step 203. Each of these steps will be described in greater detail herein below.

At step 201, threat information is retrieved or gathered by the threat data feeders module from various sources such as internal or external security research teams, tool based feeds, crowd sourcing, and so forth. In some embodiments, the sources may include, but are not limited to, network monitoring specifically social network monitoring, spam traps, honeypots, link crawling for malware and exploit code, and so forth. As stated above, the information retrieved by the threat data feeders is then provided to the threat intelligence center for further processing.

At step 202, the threat intelligence center creates combined and standardized threat information based on threat information retrieved from multiple sources in various formats and standards. The threat information provided to the threat intelligence center comprises information that has been analyzed and retrieved from multiple sources so as to discover insights that assists in preventing security threats. As will be appreciated by those skilled in the art, different sources provide threat information in various formats and standards. For example, SPLUNK tool based information may be in JavaScript Object Notation (JSON) format whereas crowd sourced threat information may be in key value pairs in comma-separated values (CSV) format. So each of these threat information are converted into one common standard format (e.g. XML schema) for subsequent use. The standard format describes the technical characteristics such as known threats, an attacker's methodology of attack, or other such evidence of threats.

The threat intelligence center then applies an intelligent filter, an analytics, or a reputation based heuristic on the combined and standardized threat information to derive security intelligence. In some embodiments, deriving security intelligence also includes identifying the right sources that provide the most valuable and best coverage that is contextualized to the specific vertical industry of the organization to which the technique is being applied. The analytics helps to contextualize and correlate events while the reputation based heuristics helps to rank the source of information, thereby ensuring that false or non-relevant threat information is eliminated. For example, in retail industry the kind of potential threats may be 'denial of service' attacks so that retail customers are not able to access the relevant stores online. Alternatively, the potential threats may be stealing some or all of confidential customer related information such as credit card information. Similarly, in healthcare industry the threat may be to steal or manipulate patient's health records. Applying analytics helps to contextualize the seriousness of any security threats. Further, threat information from a government agency may be ranked higher in reputation as compared to threat information sourced from a public forum. Such reputation based heuristics help to quickly separate the false or non-serious threats from the real and serious threats.

The threat intelligence center then determines corresponding preventive or security measures. These measures are actionable breach responses and risk mitigation strategies for each of the real threats identified. For example, the actionable response may be to 'block all packets from a specific source or to a specific destination', to 'divert all packets on a specific TCP port for further analysis', to 'remove infected files', to 'rewrite affected registry keys', and so forth.

The core security advisor receives the security measures and maps the security measure to the set of relevant virtual appliances and the set of relevant virtual switches. In some embodiments, mapping the set of relevant virtual appliances and the set of relevant virtual switches comprises generating appropriate packet filters and virtual appliances based on the security measure to be applied. The actionable breach responses are implemented in the form of packet filters with an action and virtual appliances. Packet filters are general regular expression based pattern matching filters. For example, a simple filter may be 'any packet from a specific source address'. These are applied to the virtual switches (VS1, VS2, VS3, etc.) using standard protocols like Open Flow by the virtual orchestrator. The virtual switches apply these filters to all the packets that pass through the virtual switches and perform the given action such as block packets, divert packets, and so forth. Further, the virtual appliances are pre-configured software virtual machines for performing specific tasks and may be created dynamically on the fly. For example, a virtual appliance may be created to perform deep packet analysis.

At step 203, the core security advisor dynamically applies the security measures to the computer network using relevant virtual appliances and virtual switches. The core security advisor along with the virtual orchestrator and SDN controller executes the preventive security measures in the computer network. Network function virtualization in combination with software defined networking provides the flexibility to create and deploy the required virtual appliances dynamically on the fly and program the virtual switches to apply relevant actions on the traffic that flows through them. SDN controller programs the virtual switches using the appropriate packet filters to steer suspicious and non-suspicious network traffic appropriately (e.g., non-suspicious traffic is steered away from the suspicious traffic). The virtual orchestrator deploys the relevant virtual appliances and provisions them. For example, suspicious traffic may be diverted to specialized virtual appliances (VA1, VA2, VA3, etc.) for further analysis.

As will be appreciated by one skilled in the art, a variety of processes may be employed for providing computer network security. For example, the exemplary system 100 may provide computer network security by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
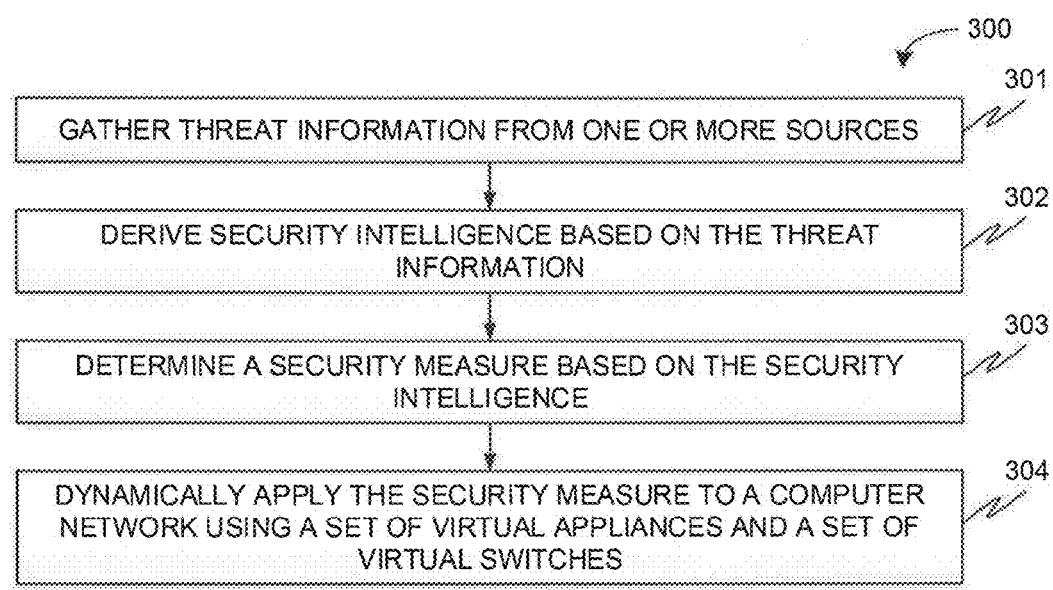
FIG. 3 is a flow diagram of an exemplary process for providing computer network security in accordance with some embodiments of the present disclosure.

For example, referring now to FIG. 3, exemplary control logic 300 for providing computer network security via a system, such as system 100, is depicted via a flowchart in accordance with some embodiments of the present disclosure. As illustrated in the flowchart, the control logic 300 includes the step of gathering threat information from one or more sources at step 301, deriving security intelligence based on the threat information at step 302, determining a security measure based on the security intelligence at step 303, and dynamically applying the security measure to a computer network using a set of virtual appliances and a set of virtual switches at step 304. In some embodiments, the control logic 300 further includes the step of triggering an alert based on the security intelligence.

It should be noted that each virtual appliance is a virtual machine for performing a pre-defined task and is implemented using network function virtualization. Further, each virtual appliance emulates at least one of a firewall, an intrusion prevention system (IPS), a deep packet inspection (DPI), and a network traffic shaper. Additionally, each virtual switch is programmed using software defined networking.

In some embodiments, deriving the security intelligence at step 302 comprises determining one or more potential security threats by applying at least one of a filter, an analytics, and a reputation based heuristic on the threat information. Additionally, in some embodiments, determining the security measure at step 303 comprises determining a corresponding security measure for each of the one or more potential security threats. Further, in some embodiments, dynamically applying at step 304 comprises mapping the security measure to the set of virtual appliances and the set of virtual switches. In some embodiments, dynamically applying at step 304 further comprises dynamically deploying the set of virtual appliances based on the mapping. Moreover, in some embodiments, dynamically applying at step 304 comprises dynamically programming the set of virtual switches using a plurality of packet filters to steer network traffic based on the mapping.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
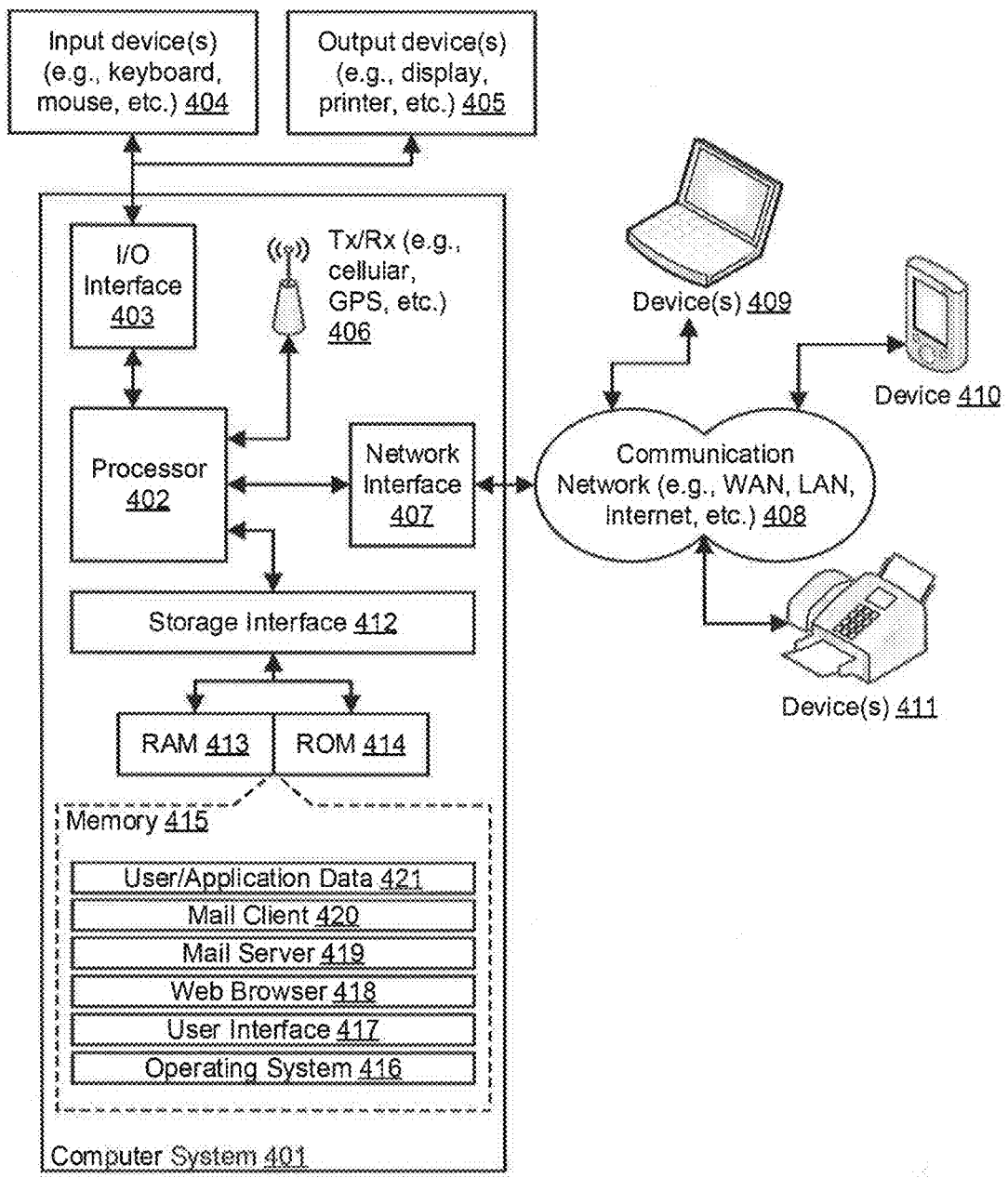
FIG. 4 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 401 for implementing embodiments consistent with the present disclosure is illustrated. Variations of computer system 401 may be used for implementing system 100 for providing computer network security. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Rash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Rash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., threat information, security threats, security measures, packet filters, virtual appliances, virtual switches, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for efficient, cost effective, and dynamic computer network security. The techniques enable improved and proactive detection and prevention of network security threats in cost effective manner using a combination of network function virtualization, software defined networking, and advanced threat intelligence. Further, the techniques enable harnessing various advances in threat intelligence exchange from multiple reliable sources by deriving right security intelligence in real time and by timely applying the appropriate preventive measures to the computer network using the appropriate virtual appliances and virtual switches. Additionally, the techniques provide for dynamically scaling-up and scaling-down the required hardware based on the load of the network traffic. Moreover, as will be appreciated by those skilled in the art, the techniques described in the various embodiments discussed above may be deployed in a customer premise or may be provided as a service. Further, the techniques may be configured to use customer's existing threat data feeders and analytics data.

The specification has described system and method for providing computer network security. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A method for providing computer network security, the method comprising:
gathering, via a processor, real-time threat information from one or more sources;
deriving, via the processor, security intelligence based on the real-time threat information;
determining, via the processor, a security measure based on the security intelligence; and
dynamically applying, via the processor, the security measure to a computer network using a set of virtual appliances and a set of virtual switches,
wherein dynamically applying comprises:
mapping the security measure to the set of virtual appliances, the set of virtual switches, and to a plurality of packet filters,
dynamically instantiating each virtual appliance in the set of virtual appliances based on the mapping using software defined networking,
service chaining virtual appliances in the set to connect the instantiated virtual appliances according to the mapping, and
dynamically programming, based on the mapping, the set of virtual switches using the plurality of packet filters to steer network traffic to the instantiated set of virtual appliances.
2. The method of claim 1, wherein deriving the security intelligence comprises determining one or more potential security threats by applying at least one of a filter, an analytics, or a reputation based heuristic on the real-time threat information.

3. The method of claim 2, wherein determining the security measure comprises determining a corresponding security measure for each of the one or more potential security threats.

4. The method of claim 1, further comprising triggering an alert based on the security intelligence.

5. The method of claim 1, wherein each of the set of virtual appliances is a virtual machine for performing a pre-defined task and is implemented using network function virtualization.

6. The method of claim 1, wherein each of the set of virtual switches is programmed using software defined networking.

7. The method of claim 1, wherein each of the set of virtual appliances emulates at least one of a firewall, an intrusion prevention system (IPS), a deep packet inspection (DPI), or a network traffic shaper.

8. A system for providing computer network security, the system comprising:
  at least one microprocessor; and
  a memory storing instructions that, when executed by the at least one microprocessor, cause the at least one microprocessor to perform operations comprising:
    gathering real-time threat information from one or more sources;
    deriving security intelligence based on the real-time threat information;
    determining a security measure based on the security intelligence; and
    dynamically applying the security measure to a computer network using a set of virtual appliances and a set of virtual switches,
    wherein dynamically applying comprises:
      mapping the security measure to the set of virtual appliances, the set of virtual switches, and a plurality of packet filters,
      dynamically instantiating each virtual appliance in the set of virtual appliances based on the mapping using software defined networking,
      service chaining virtual appliances in the set to connect the instantiated virtual appliances according to the mapping, and
      dynamically programming, based on the mapping, the set of virtual switches using the plurality of packet filters to steer network traffic to the instantiated set of virtual appliances.

9. The system of claim 8, wherein deriving the security intelligence comprises determining one or more potential security threats by applying at least one of a filter, an analytics, or a reputation based heuristic on the real-time threat information.

10. The system of claim 9, wherein determining the security measure comprises determining a corresponding security measure for each of the one or more potential security threats.

11. The system of claim 8, wherein each of the set of virtual appliances is a virtual machine for performing a pre-defined task, is implemented using network function virtualization, and emulates at least one of a firewall, an intrusion prevention system (IPS), a deep packet inspection (DPI), or a network traffic shaper.

12. The system of claim 8, wherein each of the set of virtual switches is programmed using software defined networking.

13. A non-transitory computer-readable medium storing computer-executable instructions for:
  gathering real-time threat information from one or more sources;
  deriving security intelligence based on the real-time threat information;
  determining a security measure based on the security intelligence; and
  dynamically applying the security measure to a computer network using a set of virtual appliances and a set of virtual switches,
  wherein dynamically applying comprises:
    mapping the security measure to the set of virtual appliances, the set of virtual switches, and a plurality of packet filters,
    dynamically instantiating each virtual appliance in the set of virtual appliances based on the mapping using software defined networking,
    service chaining virtual appliances in the set to connect the instantiated virtual appliances according to the mapping, and
    dynamically programming, based on the mapping, the set of virtual switches using the plurality of packet filters to steer network traffic to the instantiated set of virtual appliances.

14. The medium of claim 13, wherein deriving the security intelligence comprises determining one or more potential security threats by applying at least one of a filter, an analytics, or a reputation based heuristic on the real-time threat information, and wherein determining the security measure comprises determining a corresponding security measure for each of the one or more potential security threats.

* * * * *